Nov. 28, 1939.　　　A. G. HEWITT　　　2,181,329
PACKAGE
Filed Nov. 28, 1938　　　2 Sheets-Sheet 1
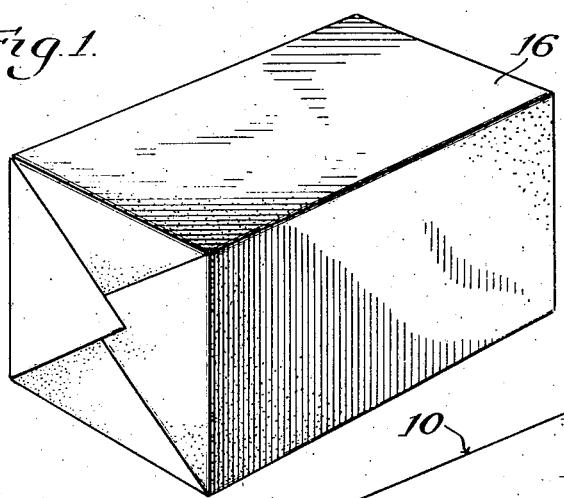
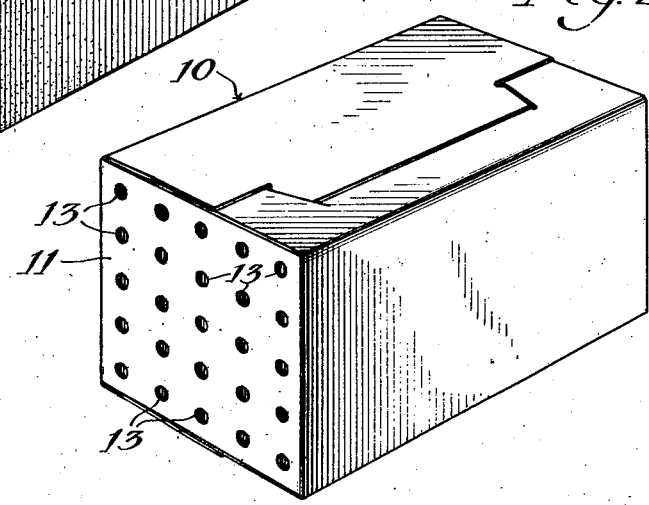
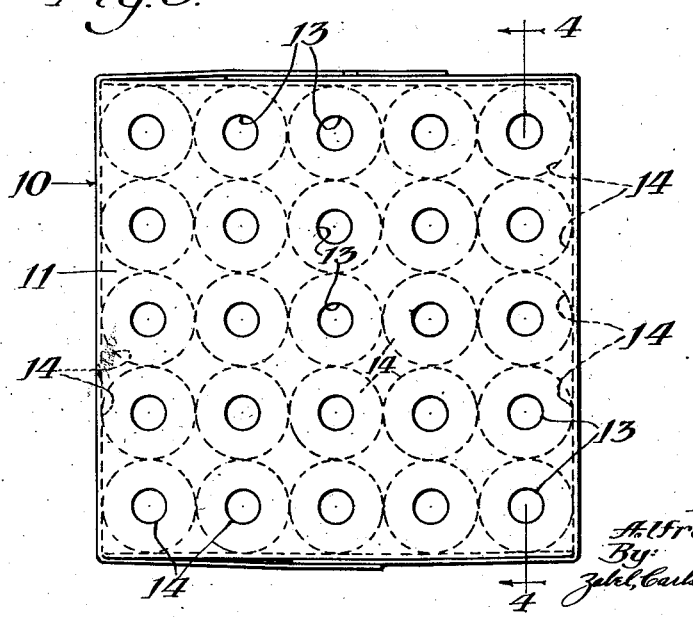
Inventor:
Alfred G. Hewitt,
By:
Zehel, Carlson, Fitzhugh & Wells
Attorneys Nov. 28, 1939.  A. G. HEWITT  2,181,329
PACKAGE
Filed Nov. 28, 1938  2 Sheets-Sheet 2
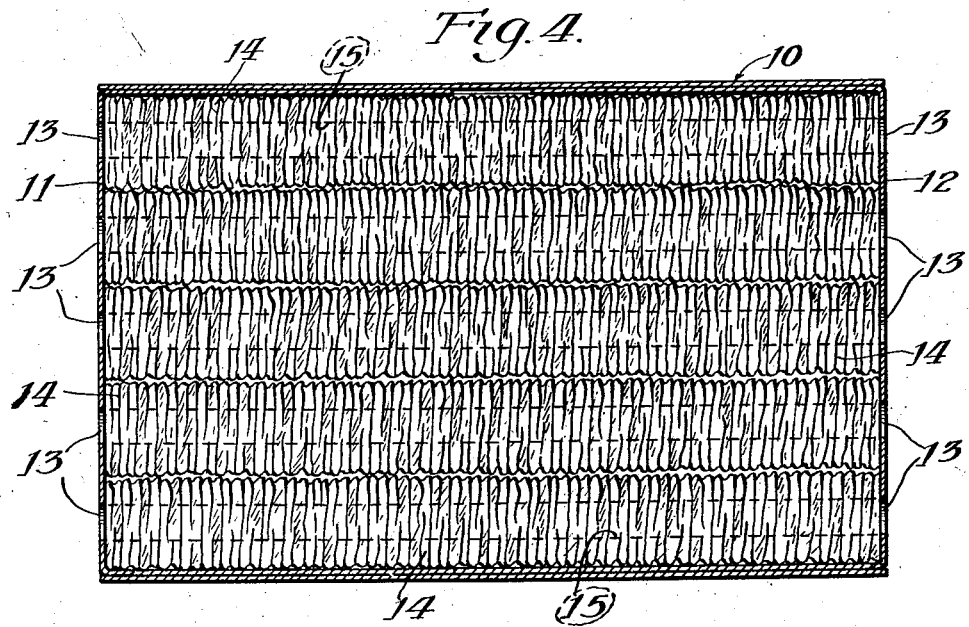
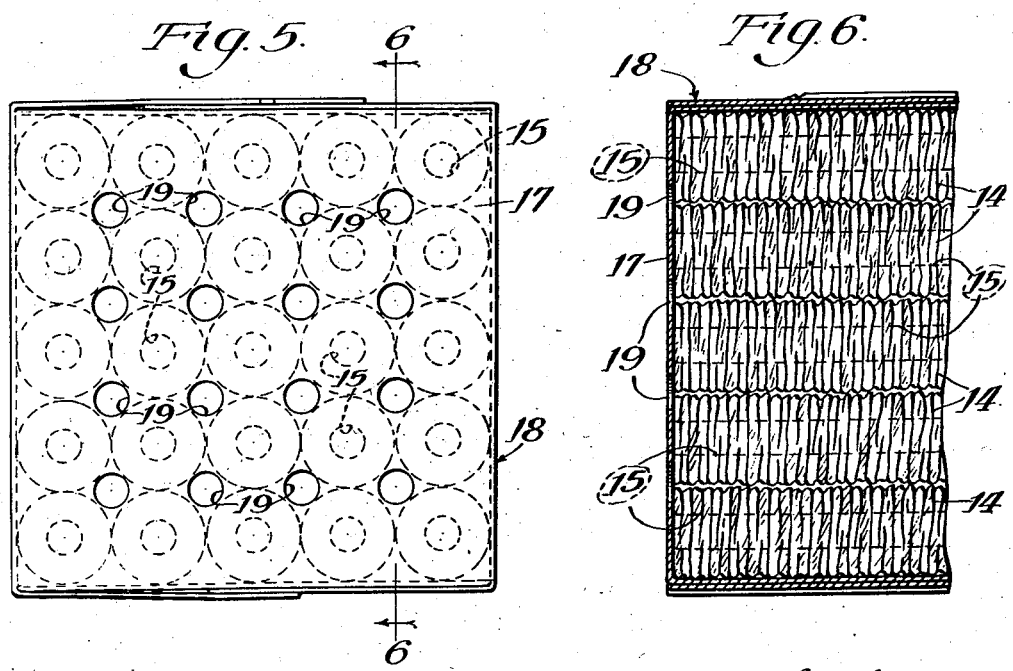
Inventor:
Alfred G. Hewitt,
By: Zabel, Carlsen, Fitzhugh & Wells
Attorneys Patented Nov. 28, 1939

2,181,329

UNITED STATES PATENT OFFICE 2,181,329

PACKAGE

Alfred G. Hewitt, La Grange Park, Ill., assignor to The Visking Corporation, Chicago, Ill., a corporation of Virginia Application November 28, 1938, Serial No. 242,697

8 Claims. (Cl. 99—271)

This invention relates to packages, and particularly to a new form of carton or packing means for artificial sausage casings, and it has for its object the provision of an improved form and arrangement of parts by which artificial sausage casings and can be treated easily for regulating their moisture content.

In the preparation of the seamless cellulose casings to which this invention particularly relates, can be handled conveniently for transportation lates, the moisture content of the material of which the casings are made is a highly important feature. In order to avoid difficulties in the forming of the casings and in the subsequent shirring operation to which they are subjected, the moisture content must be kept down. If these casings have too great a moisture content when they are reeled after drying, the casings may undergo further drying in storage before the shirring operation and shrink to such an extent on the reels as to cause difficulty in connection with the shirring operation by which ordinarily a section of casing of the length of thirty to thirty-five feet is crimped and compressed to a length of from four to six inches. The material is ordinarily kept for the manufacturing operation to a moisture content of from four to six per cent for avoiding undue sticking of the casings in the unreeling and shirring operations, even though it is possible to prevent drying out of the casings on the reels by suitable storage conditions or by suitable wrapping for preventing moisture transfer. When the shirred casings are to be used, however, it is highly important that the moisture content be substantially higher, since otherwise the casings are likely to tear when they are subjected to the pressure incident to the stuffing operation by which the sausage mixture is introduced into the casing. In preparation for the stuffing or filling operation, which is preferably carried out under such pressure conditions as to cause a five to ten per cent increase in the circumferential size of the casing, the casings are preferably conditioned so as to have a moisture content of something like eight to ten per cent, in which condition the casings are easily applied to the filler horn of the stuffing apparatus and have such capacity for stretching as to permit the desired increase in their size while at the same time resisting undue stretching such as would result in the formation of an unduly oversized product.

This invention relates to an improved form of package by virtue of which the casings can be subjected to the required conditioning operation effectively without being removed from the carton, such conditioning operation to be carried out either before the casings are shipped to the customer or by the customer in his own plant. For effecting this result, a plurality of shirred casings having openings longitudinally therethrough are arranged side by side in a plurality of layers in parallel relation to each other longitudinally of a carton which has openings in its end panels registering with the openings through the casings or alternatively registering with the longitudinally extending open spaces between the several casings. It has been found that the moisture content of casings of a package having either of the two arrangements specified is capable of being changed very readily without the necessity for opening the carton other than the removal of the outside wrapper. Repeated tests have shown that when a package of this type comprising casings having a moisture content of six per cent is kept for a day or two in an ordinary normally moist cooler with the outer wrapper removed, the moisture content of the casings is raised to eight or ten per cent as desired depending on the length of time, the change of moisture content being effected with a high degree of uniformity amongst the several casings and from one portion to another of each casing as is desired. It has been found further that when the desired degree of moisture content has been reached it can be maintained without difficulty for a period of at least several days in the desired condition by merely closing the openings by rewrapping the carton as a whole.

It is another object of this invention to improve packages of this type and the cartons by which the casings are enclosed in sundry details hereinafter pointed out. The preferred means by which these objects have been accomplished are illustrated in the accompanying drawings, in which Fig. 1 is a perspective view of a package in condition for shipping;

Fig. 2 is a similar view of the package with the outer wrapper of waxed paper removed;

Fig. 3 is an end view of the package as shown in Fig. 2;

Fig. 4 is a vertical sectional view through the package at substantially the line 4—4 of Fig. 3;

Fig. 5 is a view similar to Fig. 3 but showing a modified form of package; and

Fig. 6 is a vertical sectional view taken at the line 6—6 of Fig. 5.

Referring now to Figs. 1 to 4 inclusive of the drawings, 10 indicates a carton of any approved general form so as to be capable of being readily opened and closed and sufficiently substantial and rigid to withstand the end pressure exerted by the compressed shirred casings so as to maintain the casings in proper position and alignment, the end panels 11 and 12 of the carton being provided with a plurality of openings 13 therein. Within the carton, as is best shown in Fig. 4, there are a plurality of artificial sausage casings 14, each of which in the arrangement shown is of thick-walled tubular form, the longitudinal openings through them being indicated by the reference character 15. As is best shown in Fig. 3, the pattern of the openings 13 in the end wall 11 of the carton corresponds with the pattern of the casings 14 in the carton, the casings being equally spaced and tightly packed in the carton in layers and cross rows. The arrangement is such that the openings 13 in the carton wall stand directly opposite the openings 15 through the casings, with the result that clear passageways are provided entirely through the package for the normal entrance of air for movement through the several casings from one end thereof to the other, the arrangement of the openings 13 in the end panel 12 being the same as that of the openings in said end panel 11.

In the preferred embodiment of this invention, the casings are preferably produced by a suitable process forming no part of this present invention but covered by prior Patents No. 1,993,480 and No. 2,001,461, the material for the casings being worked in a four to six per cent moisture content condition. In this condition, the casings are packed in the carton 10 with the open ends of the casings directly opposite the openings 13 and with the casings arranged parallel to each other from one perforated panel 11 to the opposite perforated panel 12. The packed carton is then wrapped by means of a wax-treated wrapper 16 which is first closely folded about the carton and is then securely sealed by the use of heat as is well understood in the art. Under these circumstances, the casings are preserved with very little change in their moisture content.

In due time before the casings are to be used, if they have not been already preconditioned before shipment, the wrapper 16 of a carton is removed and the package is placed in an ordinary normally moist cooler for a period of hours. It has been found that under these circumstances the moisture content of the casings is gradually increased, the change in the moisture content being very uniform from one casing to another and from one part of the casing to the remaining parts, it being possible by treatment of from twenty to forty or fifty hours to raise the moisture content to something like eight or ten per cent. This result is possible because of the fact that passageways are open straight through the package through the longitudinal openings of the casings.

In Figs. 5 and 6, a similar arrangement of carton and contents is shown, except that the end panels 17 of the carton 18 shown in said Figs. 5 and 6 are provided with openings 19 differentially arranged as compared with the openings 13 as shown in Figs. 1 to 4. In Figs. 5 and 6, each of the openings 19 is arranged in centered position with respect to four contacting casings, the arrangement being such that a clear passageway is provided through the package at the space between casings rather than through the central opening of a single casing. It has been found that quite satisfactory results are obtained by the arrangement as shown in Figs. 5 and 6 comparable to the results attained by the use of the preferred form of structure.

While the arrangements as shown in the drawings are preferred, it is to be understood that the invention is not limited to these particular arrangements except so far as the claims may be so limited, it being understood that changes might well be made in the form and arrangement of parts without departing from the spirit of the invention.

I claim:

1. A package comprising in combination a carton having a series of openings in a wall portion, and a plurality of artificial sausage casings shirred and compressed longitudinally into comparatively thick-walled tubular form arranged in said carton with their ends directed toward said perforated wall portion and located in such position with respect to said wall openings as to enable air to enter through the openings and move lengthwise of the casings in close proximity to their walls for effecting a moisture conditioning treatment of the casings while contained in the carton.

2. A package comprising in combination a carton having a series of openings in its walls, and a plurality of artificial sausage casings shirred and compressed longitudinally into comparatively thick-walled tubular form arranged in said carton so as to extend from one perforated wall portion to another perforated wall portion with the openings in one wall portion having substantially the same positions relative to the end portions of the casings as the openings in the other wall portion have to the opposite end portions of the casings so as to provide passageways through the package along the walls of the casings for the movement of air along the casings for effecting a moisture conditioning treatment of the casings in position in the carton.

3. A package comprising in combination a carton having a series of openings in a wall portion through which air may pass into and out of said carton, and a plurality of artificial sausage casings shirred into substantially cylindrical form and disposed in said carton whereby air may flow through said openings to said casings for effecting a moisture conditioning treatment of the casings while contained in the carton.

4. A package comprising in combination a carton having a series of openings in two oppositely disposed walls, and a plurality of artificial sausage casings shirred and compressed longitudinally for handling into comparatively thick-walled tubular form and arranged in said carton in parallel relation to each other with the carton wall openings located substantially completely out of alignment with the wall portions of the casings so as to provide clear passageways through the package for the normal entrance of air for effecting a moisture conditioning treatment of the casings in position in the carton.

5. A package comprising in combination a carton having a series of openings in two oppositely disposed wall sections, and a plurality of artificial sausage casings shirred and compressed longitudinally for handling into comparatively thick-walled tubular form and packed substantially tight in said carton in substantially uniformly spaced relation to each other in superposed layers with their open ends located adjacent to said perforated wall sections, the pattern of said openings in each of said perforated wall sections corresponding substantially to the pattern of the casings in the carton with the carton wall openings located substantially completely out of alignment with the wall portions of the casings so as to provide clear passageways through the package for the normal entrance of air for effecting a moisture conditioning treatment of the casings in position in the carton.

6. A package comprising in combination a carton having a series of openings in two oppositely disposed wall sections, and a plurality of artificial sausage casings shirred and compressed longitudinally for handling into comparatively thick-walled tubular form and packed substantially tight in said carton in substantially uniformly spaced relation to each other in superposed layers with their open ends located adjacent to said perforated wall sections, the pattern of said openings in each of said perforated wall sections corresponding substantially to the pattern of the casings in the carton with the carton wall openings located substantially directly opposite to the openings through the casings so as to provide clear passageways through the package for the normal entrance of air for effecting a moisture conditioning treatment of the casings in position in the carton.

7. A package comprising in combination a carton having a series of openings in two oppositely disposed wall sections, and a plurality of artificial sausage casings shirred and compressed longitudinally for handling into comparatively thick-walled tubular form and packed substantially tight in said carton in substantially uniformly spaced relation to each other in superposed layers with their open ends located adjacent to said perforated wall sections, the pattern of said openings in each of said perforated wall sections corresponding substantially to the pattern of the casings in the carton with each of the carton wall openings located in substantially centered position with respect to four contacting casings so as to provide clear passageways through the package for the normal entrance of air between the casings for effecting a moisture conditioning treatment of the casings in position in the carton.

8. A package comprising in combination a carton having a series of openings in two oppositely disposed walls, a plurality of artificial sausage casings shirred and compressed longitudinally for handling into comparatively thick-walled tubular form and arranged in said carton in parallel relation to each other with the carton wall openings located substantially completely out of alignment with the wall portions of the casings so as to provide clear passageways through the package for the normal entrance of air for effecting a moisture conditioning treatment of the casings in position in the carton, and a wax-treated heat-sealed wrapper completely enclosing said carton so as effectively to cover said carton wall openings.

ALFRED G. HEWITT.